April 7, 1925.  
E. F. SWARTZ  
STOCK FEEDER  
Filed March 12, 1924  
1,532,276  
2 Sheets-Sheet 2
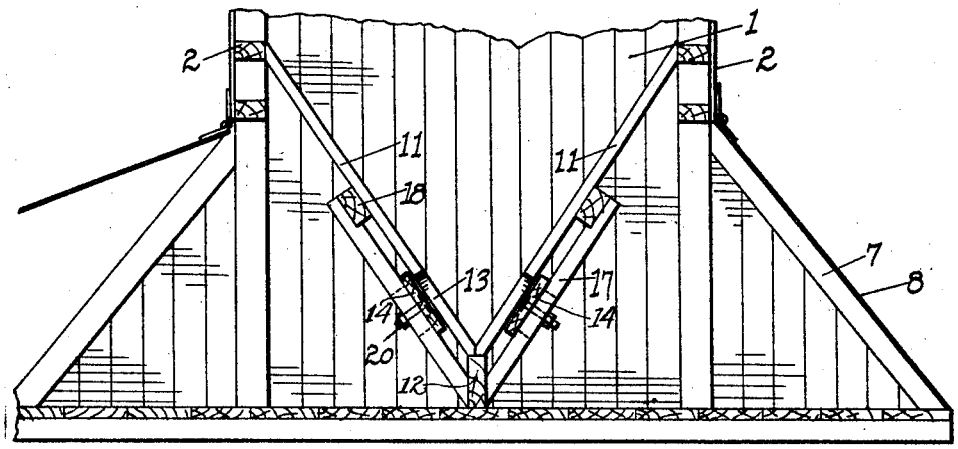
FIG-2-
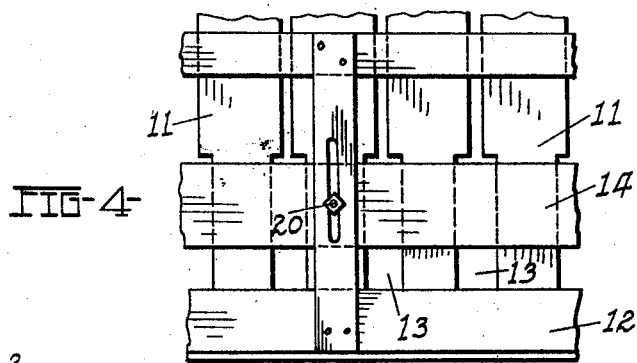
FIG-4-
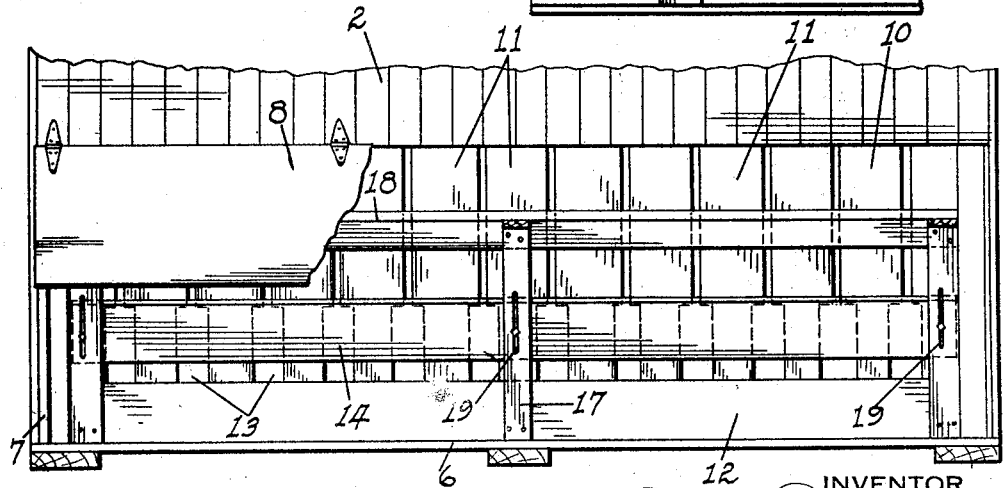
FIG-3-
INVENTOR  
Elmer F. Swartz  
by  
Owen, Owen & Crampton Patented Apr. 7, 1925.

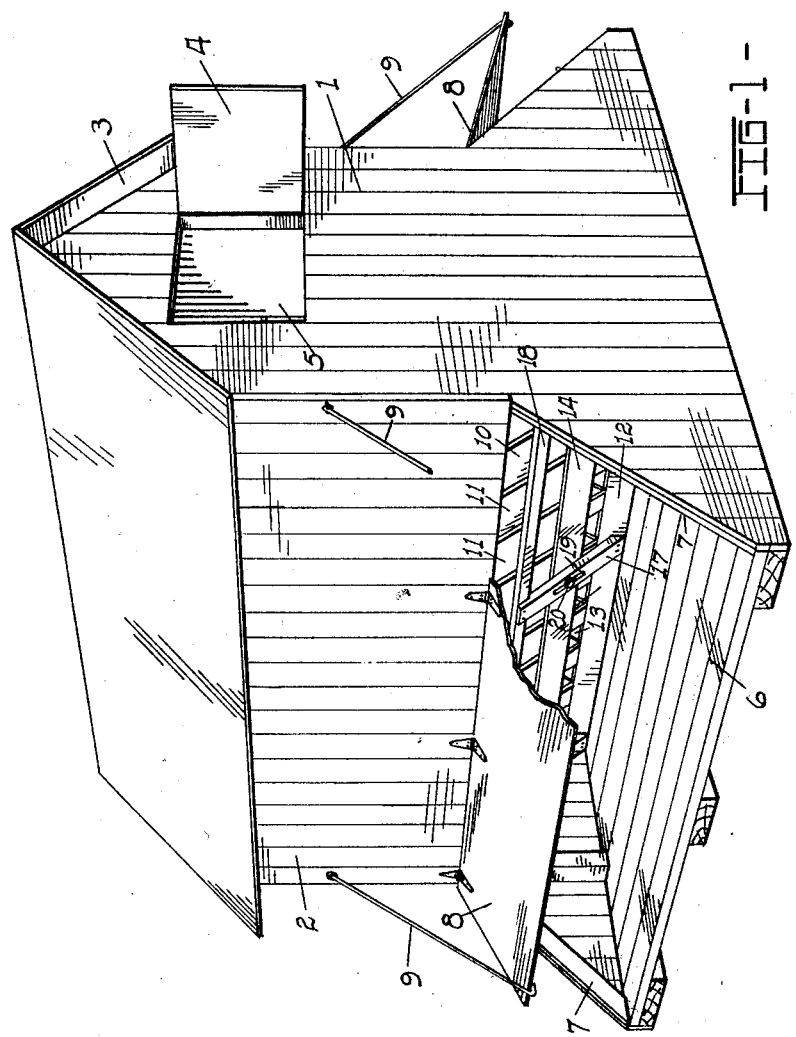

1,532,276

UNITED STATES PATENT OFFICE.

ELMER F. SWARTZ, OF PERRYSBURG, OHIO.

STOCK FEEDER.

Application filed March 12, 1924. Serial No. 698,639.

*To all whom it may concern:*

Be it known that I, ELMER F. SWARTZ, a citizen of the United States, and a resident of Perrysburg, in the county of Wood and State of Ohio, have invented a new and useful Stock Feeder, which invention is fully set forth in the following specification.

My invention has for its object to provide a stock feeder wherein the feed supply may be regulated and also wherein the stock may be sheltered during inclement weather or may be completely enclosed during severe weather, particularly during their feeding time.

To illustrate a practical application of the invention, I have shown a stock feeder containing the invention in the accompanying drawings and shall describe it hereinafter.

Figure 1 illustrates a perspective view of the stock feeder. Fig. 2 is a view of a transverse section through a part of the stock feeder. Fig. 3 is a side view of the hopper of the feeder. Fig. 4 illustrates a side view of a part of the feed-controlling device.

The stock feeder is provided with enclosing walls and doors whereby the feed itself may be easily inserted in the feeder and protected from the weather, and also the stock, particularly, hogs, can be fed while they are sheltered or completely enclosed within the feeder. The stock feeder is provided with closed side walls 1 and 2 and also with a roof 3. It has a door 4 for closing the opening 5 through which corn or other feed may be inserted in the feeder. The feeder is also provided with a flooring 6 that extends well beyond the side walls 2 of the feeder. Strips 7 located at an angle to the vertical, extend from the outer edges of the flooring 6 to the lower ends of the side walls 2. The space between the strips 7 and the flooring is also boarded up. Doors 8 extend along the lower edges of the side walls 2 and are hingedly connected thereto and so as to extend over the end portions of the flooring 6. When the doors 8 are closed, they rest upon the strips 7 and are of a width sufficient to completely enclose the flooring 6. When it is desired to shelter the feeding stock, the doors 8 may be lowered a part of the distance and yet preferably so that they will still have slope for discharge of rain water. They are held in their position of sheltering the stock by means of rods 9 having hooked ends. The rods 9 are connected to the side walls 2 of the feeder and the hooked ends engage the outer edges of the doors.

A hopper is located below the container for the feed, that is, below the space between the side walls 1 and 2, for directing the feed along the central part of the flooring 6. The hopper 10 is formed of a plurality of boards 11 such as 8-inch boards, that are placed an inch apart, that are secured at their upper ends along the lower edges of the wall 2 and at their lower ends to a board 12 that is set up on edge on the flooring 6. At the lower ends of the boards, the spaces between the boards are enlarged by cutting back from the edges of the boards a distance of about 1½ inches for a distance of six or eight inches from the ends of the boards to form the openings 13, six or eight inches long and three or four inches wide. The openings will thus be located along the upper edge of the board 12. The hopper 10 and the board 12 divide the floor space into two parts. The feed falls from the hopper 10 on to the floor 6 on opposite sides of the board 12. This places the openings 13 at the proper heighth so that the feed within the hopper cannot be disturbed by the stock.

To regulate the movement of the feed to the flooring, adjustable boards 14 may be supported by the strips 17 that are secured to the board 12 and to strips 18. The boards 14 are movable laterally along the strips 17 and so as to close the openings 13 more or less, as may be desired. The strips 17 are provided with slots 19, and bolts 20 that extend through the slots 19 may secure the boards 14 to the strips 17 whereby the boards 14 may be adjustably located in the desired position to cover, to a more or less extent, the openings 13.

I have thus provided by my invention an exceedingly simple and efficient feeder whereby the stock may be economically fed, in that the feed is not lost in the ground or destroyed by trampling of the stock, and also wherein the stock is sheltered to the desired degree notwithstanding the changing inclemency of the weather.

I claim:—

1. In a stock feeder, a container for feed, having a hopper-shaped bottom, the hopper formed of a plurality of closely positioned boards having opposed edge portions located near the lower corner of the hopper cut therefrom and forming outlets for the feed, a strip for supporting the lower ends of the said boards, doors hinged near the upper end of the said hopper and strips for supporting the ends of the doors at an incline to the horizontal, a flooring extending between the lower ends of the strips, boards for closing and sealing the sides of the container, the ends of the hopper and the space between the strips and the flooring, adjustable slide boards extending along the sloping sides of the hopper for covering the said outlets, guide strips located on the outside of the guide boards and secured to the hopper for supporting the said boards and having slots, bolts extending through the slots and into the boards for locking the boards in adjusted positions.

2. In a stock feeder, a container for feed, having a hopper-shaped bottom, the hopper formed of a plurality of closely positioned boards having opposed edge portions located near the lower corner of the hopper cut therefrom and forming outlets for the feed, a strip for supporting the lower ends of the said boards, doors hinged near the upper end of the said hopper and strips for supporting the ends of the doors at an incline to the horizontal, a flooring extending between the lower ends of the strips, the doors extending from the upper end of the hopper to the flooring, boards for closing and sealing the sides of the container, the ends of the hopper and the space between the strips and the flooring, adjustable slide boards extending along the sloping sides of the hopper for covering the said outlets, guide strips located on the outside of the guide boards and secured to the hopper for supporting the said boards and having slots, bolts extending through the slots and into the boards for locking the boards in adjusted positions.

In testimony whereof, I have hereunto signed my name to this specification.

ELMER F. SWARTZ.